(12) United States Patent
Fragner

(10) Patent No.: US 12,386,050 B2
(45) Date of Patent: Aug. 12, 2025

(54) COMPENSATION METHOD FOR OBTAINING PHASE-COHERENT STILL IMAGES WITH A BISTATIC RADAR

(71) Applicant: Beyond Gravity Austria GmbH, Vienna (AT)

(72) Inventor: Heinrich Fragner, St. Pölten (AT)

(73) Assignee: BEYOND GRAVITY AUSTRIA GMBH, Vienna (AT)

( * ) Notice: Subject to any disclaimer, the term of this patent is extended or adjusted under 35 U.S.C. 154(b) by 249 days.

(21) Appl. No.: 17/948,818

(22) Filed: Sep. 20, 2022

(65) Prior Publication Data

US 2023/0393255 A1 Dec. 7, 2023

(30) Foreign Application Priority Data

Jun. 2, 2022 (AT) .................................. A 115/2022

(51) Int. Cl.
*G01S 13/28* (2006.01)
*G01S 13/00* (2006.01)

(52) U.S. Cl.
CPC .......... *G01S 13/288* (2013.01); *G01S 13/003* (2013.01)

(58) Field of Classification Search
CPC ............................... G01S 19/01; G01S 13/003
See application file for complete search history.

(56) References Cited

U.S. PATENT DOCUMENTS 3,001,189 A * 9/1961 Pidhayny .................. G01S 1/02
342/202
2021/0302565 A1* 9/2021 Jin .......................... G01S 19/42

OTHER PUBLICATIONS

Jales, P. J., GNSS-Reflectometry: Techniques for scatterometric remote sensing, Sep. 21-24, 2010, 23rd International Technical Meeting of the Satellite Division of The Institute of Navigation, pp. 2761-2770 (Year: 2010).*

* cited by examiner

*Primary Examiner* — Vladimir Magloire
*Assistant Examiner* — Eric K Hodac
(74) *Attorney, Agent, or Firm* — Pillsbury Winthrop Shaw Pittman, LLP

(57) ABSTRACT

Method of locating a point P located on the earth's surface using bistatic radar with at least one transmitter and at least one receiver, wherein the point P has relative motion to the transmitter and/or receiver, the method comprising:
  a) emitting a measurement signal modulated onto a carrier wave from the transmitter to the surface,
  b) receiving the measurement signal reflected from the surface during a measurement period $\Delta t$ in the receiver,
  c) during the measurement period $\Delta t$ determining the runtime of the measurement signal along the signal path from the receiver via point P to the receiver,
  d) during the measurement period $\Delta t$ determining the path length of the measurement signal along the signal path,
  e) compensating the runtime of the measurement signal changing due to the relative movement of the point P to the transmitter and/or receiver during the measurement period $\Delta t$ using the path length changing during the measurement period $\Delta t$,
  f) calculating the distance of the point P from the transmitter and/or receiver based on the compensated runtime and the signal propagation speed of the measurement signal,
wherein the point P is located at a defined point relative to, preferably between, end points A and B of a line L, one end point A being the reflection point of the measurement signal at which the angle of incidence at the beginning of the measurement period $\Delta t$ is equal to the angle of reflection, and the other end point B being the reflection point of the (Continued)

measurement signal at which the angle of incidence at the end of the measurement period Δt is equal to the angle of reflection.

9 Claims, 3 Drawing Sheets

COMPENSATION METHOD FOR OBTAINING PHASE-COHERENT STILL IMAGES WITH A BISTATIC RADAR

CROSS-REFERENCE TO RELATED APPLICATIONS

This application claims priority to Austrian Patent Application Serial No. A 115/2022, filed Jun. 2, 2022, the contents of which is incorporated herein by reference in its entirety.

BACKGROUND

Field

The invention relates to a method for locating a point P located on a surface using a bistatic radar with at least one transmitter and at least one receiver, wherein the point P has relative motion to the transmitter and/or receiver.

Description of Related Art

A method of the type mentioned at the beginning is used in particular for surveying, for example, the earth's surface using satellites, whereby at least two satellites are used in the sense of a bi-static radar. This means that one satellite serves as the transmitter and another satellite as the receiver, with the transmitter emitting an electromagnetic measurement signal that is reflected by the surface to be measured and subsequently received by the receiver. The comparison of the runtime of the signal from the transmitter over the earth's surface to the receiver with, for example, a signal sent directly to the receiver, makes it possible to determine the distance traveled by the measurement signal and to calculate the geometric position of a point P on the surface on the basis of the positions of the transmitter and receiver known at each moment. In addition to comparing the runtime, surface properties can be inferred by comparing the waveform of the reflected signal with the original signal.

In particular, the surface of the world's oceans is constantly surveyed in this way to determine the exact elevation of the surface of the world's oceans. In addition to the location of point P, surface characteristics of the reflective areas such as wave height, near-ground air currents, and moisture content can be determined by comparing the reflected signal with the original signal. This makes it possible to observe the heat distribution in the oceans and the activity of global currents, which is becoming increasingly important, especially in climate research.

In order to ensure a sufficiently high signal-to-noise ratio for the interpretation of the measurement signal, it is necessary, depending on the technical conditions of the transmitter, to transmit a measurement signal over a certain integration time (measurement period $\Delta t$) and to evaluate it in the receiver. Since the receiver and the transmitter, which are e.g. non-geostationary satellites, move relative to the surface to be measured during the measurement period $\Delta t$, the measurement signal travels different distances from the transmitter over the surface to the receiver during the measurement period. From the relative motion mentioned, it further follows that the reflection point, where the angle of incidence is equal to the angle of reflection, moves on the surface.

This implies the need for a correction in the receive path of such a bi-static radar, which allows to receive the radar beams of the transmitter in a phase coherent manner. The measurement signal and the reference signal must be brought into coherence by calculation in order to make the signals comparable with each other so that a comparison of the runtimes of the signals can subsequently be made. In order to obtain a phase-coherent received signal, it is necessary to compensate for the change in position of the transmitter, receiver and reflection point on the surface during the measurement period. The accuracy of this compensation must be well below $\lambda/4$, where $\lambda$ is the carrier frequency wavelength of the measurement signal. For smooth surfaces, it is sufficient to compensate for the changes in the path length of the reflected signal occurring during the measurement period by a time delay resulting from the wave propagation speed corresponding to the idealized course of the reflection point on the surface to be measured. While this works well for surfaces with roughness below $\lambda/4$, such as calm waters or ice surfaces, in the case of a rough surface, such as on an ocean with corresponding wave action, this is not suitable for obtaining phase-coherent signal accumulation during the measurement period. As the roughness increases, the change in surface shape during the measurement period $\Delta t$ causes the reflected signal to have a different phase at the end of the measurement period than at the beginning of the measurement period.

SUMMARY

The invention is therefore based on the task of providing a computational compensation for rough surfaces in the method mentioned at the beginning, so that it is possible to use bi-static radar measurement methods reliably for surveying, for example, sea surfaces.

To solve this problem, the method of the type described above for locating a stationary point P located on a surface comprises
  a) emitting a measurement signal modulated onto a carrier wave from the transmitter to the surface,
  b) receiving the measurement signal reflected from the surface during a measurement period $\Delta t$ in the receiver,
  c) during the measurement period $\Delta t$ determining the runtime of the measurement signal along the signal path from the receiver via point P to the receiver,
  d) during the measurement period $\Delta t$ determining the path length of the measurement signal along the signal path,
  e) compensating the runtime of the measurement signal changing due to the relative movement of the point P to the transmitter and/or receiver during the measurement period $\Delta t$ using the path length changing during the measurement period $\Delta t$,
  f) calculating the actual (including residual error) distance of the point P from the transmitter and/or receiver based on the compensated runtime and the signal propagation speed of the measurement signal,
wherein the point P is located at a defined point relative to, preferably between, end points A and B of a line L, one end point A being the reflection point of the measurement signal at which the angle of incidence at the beginning of the measurement period $\Delta t$ is equal to the angle of reflection, and the other end point B being the reflection point of the measurement signal at which the angle of incidence at the end of the measurement period $\Delta t$ is equal to the angle of reflection.

Thus, for the calculation, instead of the reflection points changing during the measurement period $\Delta t$, a fixed reflection point P at the earth's surface is chosen, which is ideally but not necessarily located between the end points of the line L mentioned above. By using a fixed reflection point, the negative effects described above regarding the phase shift due to different surface shapes at different reflection points can be avoided. Due to the relative movement of the transmitter and receiver to the stationary reflection point P, holding the point P stationary during the measurement period results in the signal reflected at the point P not corresponding to the main lobe during a major part of the measurement period, where the angle of incidence corresponds to the angle of reflection, but in a signal being detected by the receiver which has arisen at the surface by diffuse reflection of the incident measurement signal. The scattering causes the reflected wave to expand into a lobe.

Due to the invention, longer measurement times Δt can be applied, which may be necessary to obtain a satisfactory signal-to-noise ratio without shifting the phase position beyond a dimension of λΔ/4, i.e., a quarter of the wavelength of the carrier frequency. Preferably, step c) is carried out in such a way that the runtime of the measurement signal along the signal path is determined continuously or at regular intervals during the entire measurement period Δt. The determination of the runtime does not have to take place simultaneously with the signal acquisition, but usually represents a downstream step in which the stored received signals are evaluated.

The same applies to step d). Preferably, step d) is carried out in such a way that the path length of the measurement signal along the signal path is determined continuously or at regular intervals during the entire measurement period Δt. The determination of the path length does not have to take place at the same time as the signal acquisition, but usually represents a downstream step in which the stored received signals are evaluated.

Preferably, the determination of the path length in step d) comprises the following steps:
i) geometrically determining the position of the end point A based on the known position of the transmitter and the receiver and based on the runtime of the measurement signal at the beginning of the measurement period Δt,
ii) geometrically determining the position of the end point B based on the known position of the transmitter and the receiver and based on the runtime of the measurement signal at the end of the measurement period Δt,
iii) calculating the position of the stationary point P, which is preferably located on the line L,
iv) determining the length of the signal path from the receiver through point P to the receiver as the sum of the distance between the known position of the transmitter to point P and the distance between the known position of the receiver to point P.

In steps i) and ii), the position of the end point A or B is determined at the point where the angle of reflection at the beginning or end of the measurement period Δt is equal to the angle of incidence.

According to a preferred method, the point P is located midway between the end points of the line L.

Preferably, the transmitter and receiver are located in satellites of a global navigation satellite system. Thus, the method according to the invention does not require dedicated satellites, but the satellites of a global navigation satellite system (e.g. NAVSTAR GPS, Galileo, GLONASS) that are available anyway can be used. The signal emitted by the satellites mentioned for location determination purposes is used as the measurement signal here.

As known per se, the determination of the runtime in step c) comprises the comparison of the measurement signal received in the receiver with a reference signal.

The measurement signal can be generated synchronously in the transmitter and the reference signal in the receiver.

Alternatively, the reference signal can be generated in the transmitter and sent directly from the transmitter to the receiver.

BRIEF DESCRIPTION OF DRAWINGS

The invention is explained in more detail below with reference to an example of an embodiment shown in the drawing. Therein.

DETAILED DESCRIPTION

Figure 1:
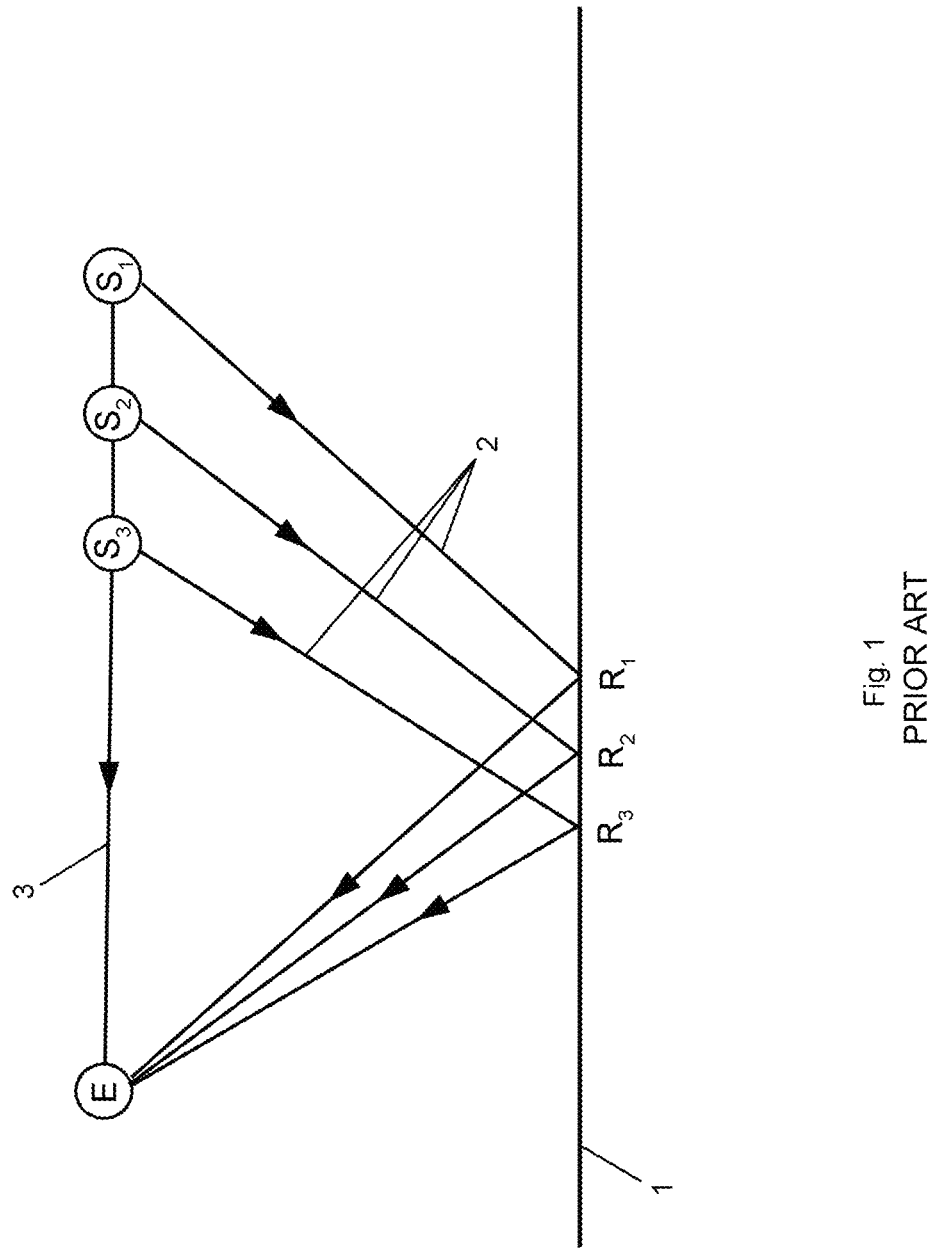
FIG. 1 shows a prior art method.

FIG. 1 illustrates a prior art method using a satellite-based bistatic radar comprising a satellite configured as a transmitter S and a satellite configured as a receiver E. The satellites are not geostationary and therefore have a relative velocity to the earth's surface 1, which in the simplified version shown in FIG. 1 is a flat earth surface. Although both the transmitter S and the receiver E have relative motion to the earth's surface 1, only the transmitter is shown moving in FIG. 1 for simplicity and clarity. The transmitter is at position $S_1$ at a time t0, at position $S_2$ at a time t1 and at position $S_3$ at a time t2. The time period from t0 to t2 is referred to as the measurement period Δt, during which the measurement signals reflected from the earth's surface 1 are received and evaluated in the receiver E.

The measurement signal 2 is sent from the transmitter S to the earth's surface 1, where it is reflected and detected by the receiver E. The receiver E evaluates the signal by comparing it with a reference signal 3 received directly (i.e. without the detour of reflection at the earth's surface 1) from the receiver E. Alternatively, the reference signal can also be generated in receiver E synchronously with transmitter S. From the time shift of the measurement signal received in receiver E compared to the reference signal, a runtime of the signal can be determined and from the runtime, taking into account the known signal propagation speed, the path length along the signal path from transmitter S via the reflection point R to receiver E can be calculated.

The positions of the transmitter S, the receiver E and the reflection point R are variable in time and are commonly referred to as $\vec{s}_s(t)$, $\vec{s}_e(t)$, $\vec{s}_r(t)$. In this application, the location vectors of the receiver E and the transmitter S are determined by the two satellites and are known at any time. The location of the reflection point R on the earth's surface is calculated from the path length of the measurement signal calculated as above and from geometric considerations at the location where the angle of incidence is equal to the angle of reflection. The path length can be represented by the following formula:

$$s(t) = |\vec{s}_s(t) - \vec{s}_r(t)| + |\vec{s}_r(t) - \vec{s}_e(t)| \qquad \text{(Formula 1)}$$

In general, the receiver E needs a measurement signal 1 of finite time to perform this comparison with the reference signal 2. The required measurement period Δt depends on the signal-to-noise ratio of the received signal and can also be referred to as the integration time.

In order to obtain a phase-coherent received signal, it is necessary to compensate the geometrical change of the three points (transmitter S, receiver E and reflection point R) in receiver E during this period Δt. According to the state of the art, the changes occurring during the measurement period Δt in the path length of the reflected signal calculated with Formula 1 are compensated by a time delay resulting from the wave propagation speed corresponding to the course of s(t). Compensation is usually implemented in receiver E, but can also be implemented in transmitter S. The compensation of the changing path length is adjusted continuously or at regular intervals, whereby only three compensation stages are shown in FIG. 1 as an example. At the beginning of the measurement period Δt (position $S_1$ of the transmitter and position $R_1$ of the reflection point) the runtime of the measurement signal is the longest. At the end of the measurement period Δt (position $S_3$ of the transmitter and position $R_3$ of the reflection point) the runtime of the measurement signal is shortest. In between (position $S_2$ of the transmitter and position $R_2$ of the reflection point) is the runtime between these extreme values. The respective path lengths s(t0), s(t1) and s(t2) are determined using formula 1 and the runtime differences resulting from the change in path length are compensated.

Figure 2:
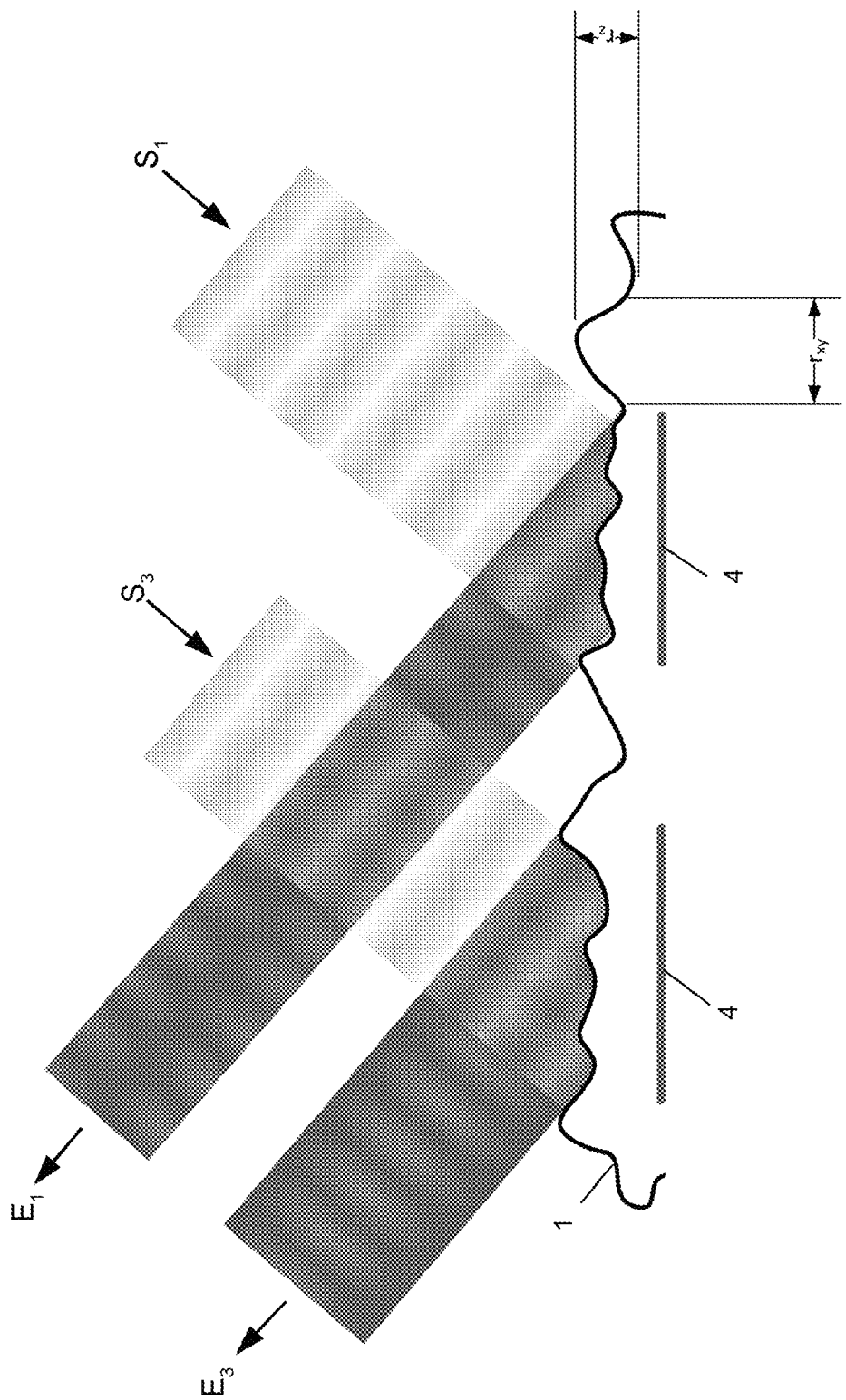
FIG. 2 shows a schematic representation of the reflectance behavior on a rough surface.

The compensation described above works for surfaces whose roughness is below λ/4 (calm waters, ice surfaces). For the case of a rough surface, such as on the ocean with corresponding wave action, this compensation does not allow phase-coherent signal accumulation during the measurement period Δt. This is illustrated in FIG. 2.

The reflection point R has an increasing extension, especially with rough surfaces, i.e. it is a reflection zone 4 and not a mathematical point. Every single point within this zone contributes to the reflection of the wave. This zone continues to move on the earth's surface during the integration time. The different shape of the reflecting structure within the zone leads to a different phasing of the reflected signal at the end of the integration time. For surfaces with a roughness above (rz, rxy>λ/4), the displacement of the reflection point during the integration time is decisive for the change of the phasing of the reflected signal. To keep phase coherence in this case, the displacement of the reflection point must be kept smaller than λ/4 during the integration time.

Figure 3:
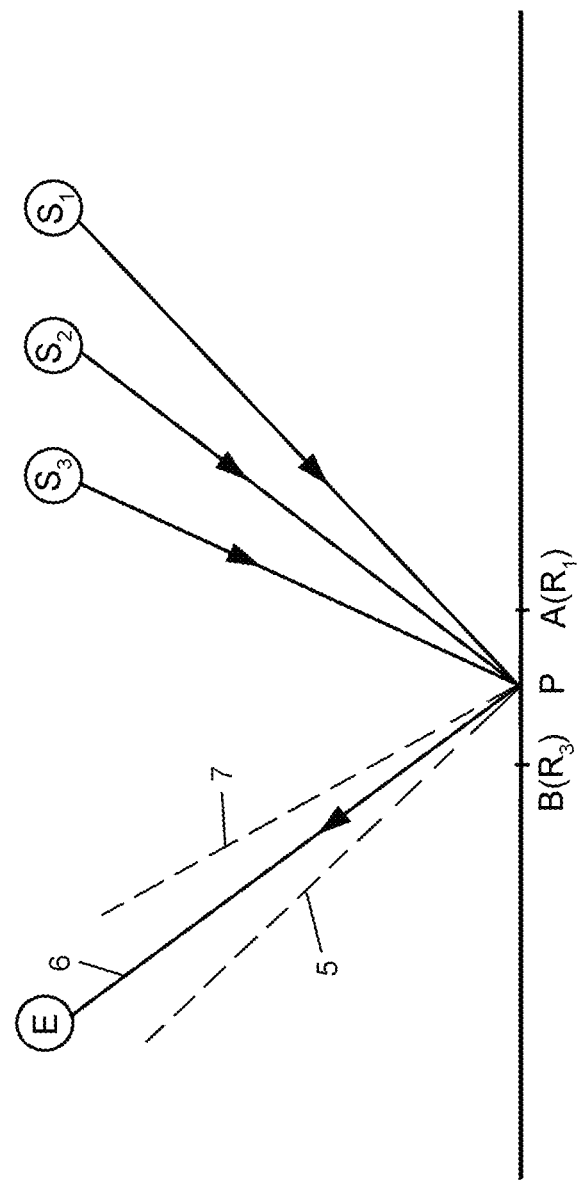
FIG. 3 shows a method according to the present invention.

To take advantage of this effect, the compensation of the path length of the reflected signal (and, if necessary, its derivatives) is modified according to the invention as follows (see FIG. 3):

For the calculation, a fixed reflection point P at the earth's surface is chosen instead of the reflection points changing during the measurement period Δt. A stationary point on the earth's surface accordingly also requires the consideration of the earth's rotation. Ideally, this is located at that point of the reflection zone where it actually comes to rest in the middle of the integration interval Δt due to the relationship angle of incidence=angle of reflection. Thus, in formula 1 a correction term $\vec{s}_r$ is used which is constant during the measurement period Δt:

$$s(t)=|\vec{s}_s(t)-\vec{s}_r|+|\vec{s}_r-\vec{s}_e(t)| \quad \text{(Formula 1)}$$

Here the correction term corresponds to the fixed position of point P and the path length of the measurement signal from the time-varying position of transmitter S via point P to the time-varying position of receiver S is used for compensation.

With a continuous stringing together of individual recordings, this results in a piece-by-piece steady approximation of Formula 1. The optimal vector for the reflection point P can be calculated with the following equation:

$$\vec{s}_r = \frac{\vec{s}_r(0) + \vec{s}_r(\Delta t)}{2}$$

This means that the point P results in the middle between the points A and B, where the point A corresponds to the reflection point $R_1$ of the measurement signal, at which the angle of incidence at the beginning of the measurement period Δt is equal to the angle of reflection, and the point B corresponds to the reflection point $R_3$ of the measurement signal, at which the angle of incidence at the end of the measurement period Δt is equal to the angle of reflection.

The invention is based on the fact that the waves are reflected diffusely due to the surface roughness. This causes each reflected wave to expand into a lobe whose maximum points in the direction of the angle of reflection α, which is equal to the angle of incidence. If the angle of reflection deviates from α, the signal amplitude of the reflected signal decreases. If the deviation from the angle α remains small during the integration time, the reduction of the signal amplitude is also very small and can be neglected for typical orbits and integration times.

Due to the fact that a fixed reflection point P at the earth's surface is selected for the calculation, not only the main lobe of the reflected signal is detected in the receiver. At the beginning of the measurement period Δt, the main lobe of the signal reflected at point P would correspond to line 5 according to the rule angle of incidence=angle of reflection. The actual detected signal 6 corresponds to a side lobe of the signal reflected and scattered at point P. Likewise, at the end of the measurement period Δt, the main lobe of the signal reflected at point P would correspond to line 7 according to the rule angle of incidence=angle of reflection. However, the actual detected signal 6 corresponds again to a side lobe of the signal reflected and scattered at point P.

With this compensation, the phase position of those waves reflected at point P is kept approximately constant during the integration times and the signal is thus summed up, while the other reflected waves average out over the integration time due to the changing phasing.

The invention claimed is:

1. A method of locating a point P that is stationary and located on the earth's surface using bistatic radar with at least one transmitter and at least one receiver, wherein there is relative movement of the transmitter and/or receiver to the point P, the method comprising:
   a) emitting a measurement signal modulated onto a carrier wave from the transmitter to the earth's surface,
   b) receiving the measurement signal reflected from the earth's surface during a measurement period Δt in the receiver,
   c) during the measurement period Δt continuously or at intervals determining a runtime of the measurement signal along a signal path from the transmitter via the point P to the receiver,
   d) during the measurement period Δt continuously or at intervals determining a path length of the measurement signal along the signal path,
   e) continuously or at intervals compensating the runtime of the measurement signal changing due to the relative movement of the point P to the transmitter and/or receiver during the measurement period Δt using the path length changing during the measurement period Δt,
   f) calculating a distance of the point P from the transmitter and/or receiver based on the compensated runtime and a signal propagation speed of the measurement signal, wherein the point P is located at a defined point relative to end points A and B of a line L, one end point A being a reflection point of the measurement signal at which an angle of incidence at the beginning of the measurement period Δt is equal to an angle of reflection, and the other end point B being the reflection point of the measurement signal at which the angle of incidence at the end of the measurement period $\Delta t$ is equal to the angle of reflection.

2. The method according to claim 1, characterized in that the point P is located midway between the end points of the line L.

3. The method according to claim 1, characterized in that the transmitter and the receiver are located in satellites of a global navigation satellite system.

4. The method according to claim 1, characterized in that the determination of the path length in step d) comprises the following steps:
   i) geometrically determining a position of the end point A based on the known position of the transmitter and the receiver and based on the runtime of the measurement signal at the beginning of the measurement period $\Delta t$,
   ii) geometrically determining a position of the end point B based on the known position of the transmitter and the receiver and based on the runtime of the measurement signal at the end of the measurement period $\Delta t$,
   iii) calculating the position of the stationary point P,
   iv) determining the length of the signal path from the transmitter through point P to the receiver as a sum of the distance between the known position of the transmitter to point P and the distance between the known position of the receiver to point P.

5. The method according to claim 1, characterized in that the determination of the runtime in step c) comprises comparing the measurement signal received in the receiver with a reference signal.

6. The method according to claim 5, characterized in that the measurement signal is generated in the transmitter and the reference signal is generated in the receiver, wherein the measurement signal and the reference signal are synchronously generated.

7. The method according to claim 5, characterized in that the reference signal is generated in the transmitter and sent directly from the transmitter to the receiver.

8. The method of claim 1, wherein the point P is located at a defined point between the end points A and B of the line L.

9. The method of claim 4, wherein the point P is located on the line L.

* * * * *